United States Patent
Yun et al.

(10) Patent No.: US 9,606,402 B2
(45) Date of Patent: Mar. 28, 2017

(54) LIQUID CRYSTAL DISPLAY HAVING INJECTION HOLES WITH DIFFERENT HEIGHTS AND METHOD OF MANUFACTURING THE SAME

(71) Applicant: SAMSUNG DISPLAY CO., LTD., Yongin, Gyeonggi-Do (KR)

(72) Inventors: Hae Ju Yun, Gyeonggi-do (KR); Soo Jung Lee, Gyeonggi-do (KR); Jung Wook Lee, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 236 days.

(21) Appl. No.: 14/261,636

(22) Filed: Apr. 25, 2014

(65) Prior Publication Data

US 2015/0131042 A1 May 14, 2015

(30) Foreign Application Priority Data

Nov. 14, 2013 (KR) ........................ 10-2013-0138569

(51) Int. Cl.
| | |
|---|---|
| *G02F 1/1337* | (2006.01) |
| *G02F 1/1333* | (2006.01) |
| *G02F 1/136* | (2006.01) |
| *G02F 1/1343* | (2006.01) |
| *G02F 1/1341* | (2006.01) |

(52) U.S. Cl.
CPC ...... *G02F 1/1341* (2013.01); *G02F 1/133377* (2013.01)

(58) Field of Classification Search
CPC ............ G02F 1/133377; G02F 1/1341; G02F 1/1337; G02F 1/136209; G02F 2001/133776
USPC .................. 349/110, 124, 106, 43, 141–144; 438/27–30
See application file for complete search history.

(56) References Cited

U.S. PATENT DOCUMENTS

| 2014/0198286 A1 | 7/2014 | Lee et al. |
| 2014/0267966 A1* | 9/2014 | Won .................. G02F 1/133377 349/42 |

(Continued)

FOREIGN PATENT DOCUMENTS

| CN | 103217829 | 7/2013 |
| CN | 103926725 | 7/2014 |

(Continued)

*Primary Examiner* — Huyen Ngo
(74) *Attorney, Agent, or Firm* — F. Chau & Associates, LLC

(57) ABSTRACT

A liquid crystal display includes a substrate and a thin film transistor disposed on the substrate. A pixel electrode is connected to the thin film transistor. A roof layer faces the pixel electrode. A plurality of microcavities are disposed between the pixel electrode and the roof layer. A first microcavity is filled with a liquid crystal material. A first injection hole and a second injection hole are disposed at edges of the first microcavity. According to the present invention, a height of the first injection hole is different from a height of the second injection hole. A plurality of grooves extend in a direction parallel to a top surface of the substrate and are disposed between the plurality of microcavities. According to the present invention, an alignment material layer is disposed in one of the grooves.

20 Claims, 23 Drawing Sheets

(56) References Cited

U.S. PATENT DOCUMENTS

2014/0307215 A1\* 10/2014 Lee .................. G02F 1/133377
　　　　　　　　　　　　　　　　　　　　　　　　349/143
2014/0368781 A1\* 12/2014 Song .................... G02F 1/1341
　　　　　　　　　　　　　　　　　　　　　　　　349/139

FOREIGN PATENT DOCUMENTS

| | | |
|---|---|---|
| JP | 2013148890 | 8/2013 |
| JP | 2014137594 | 7/2014 |
| KR | 1020120026880 | 3/2012 |
| KR | 1020130084842 | 7/2013 |
| KR | 1020130124827 | 11/2013 |
| KR | 1020140071550 | 6/2014 |
| KR | 1020140092662 | 7/2014 |
| KR | 1020150015766 | 2/2015 |

\* cited by examiner

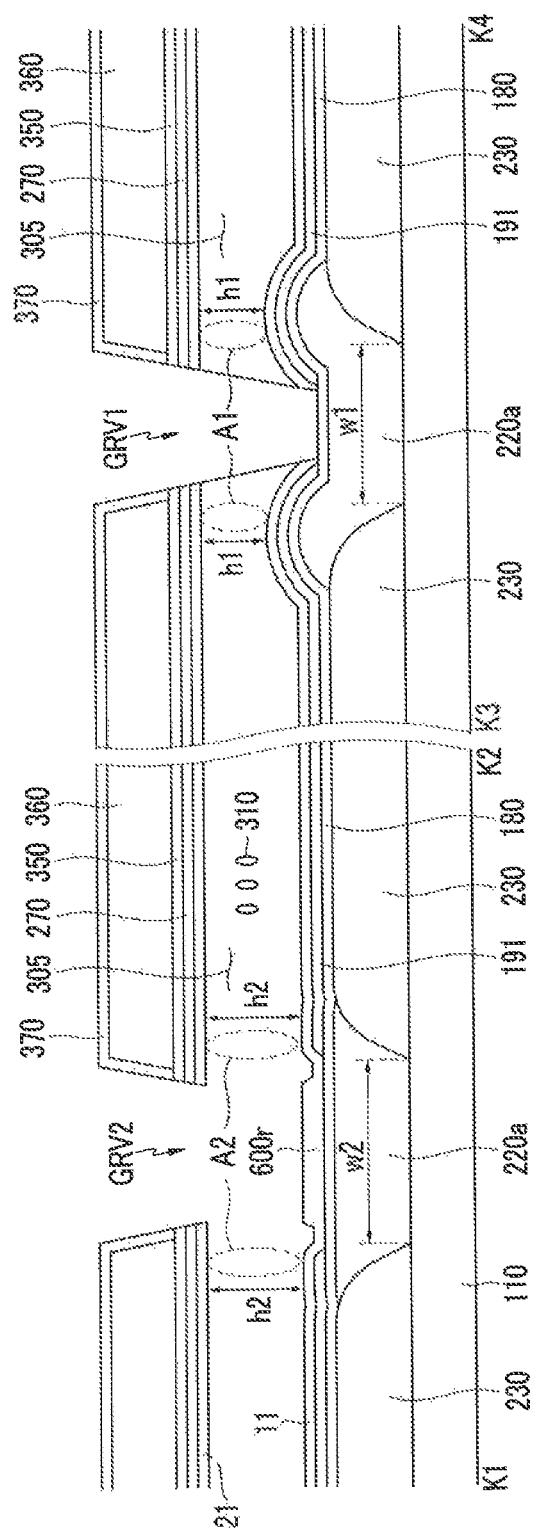

LIQUID CRYSTAL DISPLAY HAVING INJECTION HOLES WITH DIFFERENT HEIGHTS AND METHOD OF MANUFACTURING THE SAME

CROSS-REFERENCE TO RELATED APPLICATION

This application claims priority under 35 U.S.C. §119 to Korean Patent Application No. 10-2013-0138569 filed in the Korean Intellectual Property Office on Nov. 14, 2013, the disclosure of which is incorporated by reference herein in its entirety.

(a) Technical Field

The present invention relate to a liquid crystal display, and more particularly to a method of manufacturing the same.

(b) Discussion of Related Art

A liquid crystal display is a type of flat panel display currently in use. A liquid crystal display may include two sheets of display panels with field generating electrodes, such as a pixel electrode and a common electrode, and a liquid crystal layer interposed therebetween.

Liquid crystal displays may display an image by generating an electric field in the liquid crystal layer by applying a voltage to the field generating electrodes, wherein the electric field determines the direction of liquid crystal molecules in the liquid crystal layer and controls polarization of incident light.

A liquid crystal display may include a plurality of microcavities in a pixel that are filled with a liquid crystal.

A technique of forming the plurality of microcavities may include a process of injecting an aligning agent in the plurality of microcavities and then drying the injected aligning agent before injecting the liquid crystal. However, microcavities formed this way may cause light leakage or deterioration of transmittance may occur.

SUMMARY

Exemplary embodiments of the present invention provide a liquid crystal display and a method for manufacturing the same. The liquid crystal display may prevent a solid content of an aligning agent from being agglomerated.

An exemplary embodiment of the present invention provides a liquid crystal display, including a substrate and a thin film transistor disposed on the substrate. A pixel electrode is connected to the thin film transistor. A roof layer faces the pixel electrode. A plurality of microcavities are disposed between the pixel electrode and the roof layer. A first microcavity is filled with a liquid crystal material. A first injection hole and a second injection hole are disposed at edges of the first microcavity. The height of the first injection hole and the second injection hole are different from each other. A plurality of grooves extending in a first direction is disposed between the plurality of microcavities. An alignment material layer is disposed on at least one of the grooves.

The plurality of microcavities may be disposed in a matrix form. A first groove and a second groove may extend in a row direction between the plurality of microcavities. One of the first groove and the second groove may be disposed in an odd numbered row between the plurality of microcavities, and the other one of the first groove and the second groove may be disposed in an even numbered row between the plurality of microcavities.

The liquid crystal display may further include a plurality of organic layers disposed on the substrate. A light blocking member disposed between the plurality of organic layers. The light blocking member may include a first light blocking member corresponding to the first groove and a second light blocking member corresponding to the second groove. An overlapping width of the first light blocking member and an edge of the organic layer may be larger than an overlapping width of the second light blocking member and the edge of the organic layer.

A first distance between the organic layers which are adjacent to each other with respect to the first light blocking member may be smaller than a second distance between the organic layers which are adjacent to each other with respect to the second light blocking member.

A first distance between the organic layers which are adjacent to each other with respect to the first light blocking member may be the same as a second distance between the organic layers which are adjacent to each other with respect to the second light blocking member.

The liquid crystal display may further include a plurality of organic layers disposed on the substrate. A light blocking member may be disposed between the plurality of organic layers. An insulating layer may be disposed on the plurality of organic layers and the light blocking member. The light blocking member may include a first light blocking member corresponding to the first groove and a second light blocking member corresponding to the second groove. The insulating layer may include a protrusion disposed adjacent to a portion of the liquid crystal display where the first light blocking member and an edge of the organic layer overlap with each other.

A thickness of a first alignment material layer disposed in the first groove and a thickness of a second alignment material layer disposed in the second groove may be different from each other.

The alignment material layer may be disposed in the first groove, but need not be disposed in the second groove.

The liquid crystal display may further include a capping layer disposed on the roof layer. The capping layer may cover the first groove and the second groove.

The liquid crystal display may further include alignment layers disposed at an upper portion and a lower portion of the first microcavity.

An exemplary embodiment of the present invention provides a method of manufacturing a liquid crystal display, including forming a thin film transistor on a substrate. The method includes forming a pixel electrode to be connected with the thin film transistor. The method includes forming a sacrificial layer on the pixel electrode. The method includes forming a roof layer on the sacrificial layer. The method includes patterning the roof layer so that a part of the sacrificial layer is exposed. The method includes forming a plurality of microcavities disposed between the pixel electrode and the roof layer by removing the sacrificial layer and forming a plurality of grooves extending in a first direction between the plurality of microcavities. The method includes injecting an aligning agent into one of a first groove and a second groove which are adjacent to each other among the plurality of grooves. The method includes injecting a liquid crystal material into the plurality of microcavities through a first injection hole and a second injection hole which are formed at edges of the plurality of microcavities. A height of the first injection hole and a height of the second injection hole are different from each other. A capping layer is formed on the roof layer. An alignment material layer is formed on at least one of the first groove and the second groove.

The plurality of microcavities may be formed in a matrix form. The first groove and the second groove may be formed to extend in a row direction between the plurality of microcavities. One of the first groove and the second groove may be formed in an odd numbered row between the plurality of microcavities, and the other one of the first groove and the second groove may be formed in an even numbered row between the plurality of microcavities.

The method of manufacturing a liquid crystal display may further include forming a plurality of organic layers on the substrate. A light blocking member may be formed between the plurality of organic layers. The light blocking member may include a first light blocking member corresponding to the first groove and a second light blocking member corresponding to the second groove. An overlapping width of the first light blocking member and an edge of the organic layer is larger than an overlapping width of the second light blocking member and an edge of the organic layer.

A first distance between the organic layers which are adjacent to each other with respect to the first light blocking member may be smaller than a second distance between the organic layers which are adjacent to each other with respect to the second light blocking member.

A first distance between the organic layers which are adjacent to each other with respect to the first light blocking member may be substantially the same as a second distance between the organic layers which are adjacent to each other with respect to the second light blocking member.

A size of the first light blocking member may be larger than a size of the second light blocking member.

The method of manufacturing a liquid crystal display may further include forming a plurality of organic layers on the substrate. A light blocking member may be formed between the plurality of organic layers; and forming an insulating layer on the plurality of organic layers and the light blocking member. The light blocking member may include a first light blocking member disposed to correspond to the first groove and a second light blocking member disposed to correspond to the second groove. The insulating layer may include a protrusion disposed to be adjacent to a portion of the liquid crystal display where the first light blocking member and the edge of the organic layer overlap with each other.

The alignment agent may be injected into the first groove, but need not be injected into the second groove.

The aligning agent may include an alignment material configured by a solid material and a solvent. The remaining solid material may form the alignment layer after the solvent is evaporated.

The alignment material layer may be formed in the first groove, but need not be formed in the second groove.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

FIGS. 9 to 23 are cross-sectional views illustrating a method of manufacturing a liquid crystal display according to an exemplary embodiment of the present invention.

DETAILED DESCRIPTION OF THE EMBODIMENTS

Figure 1:
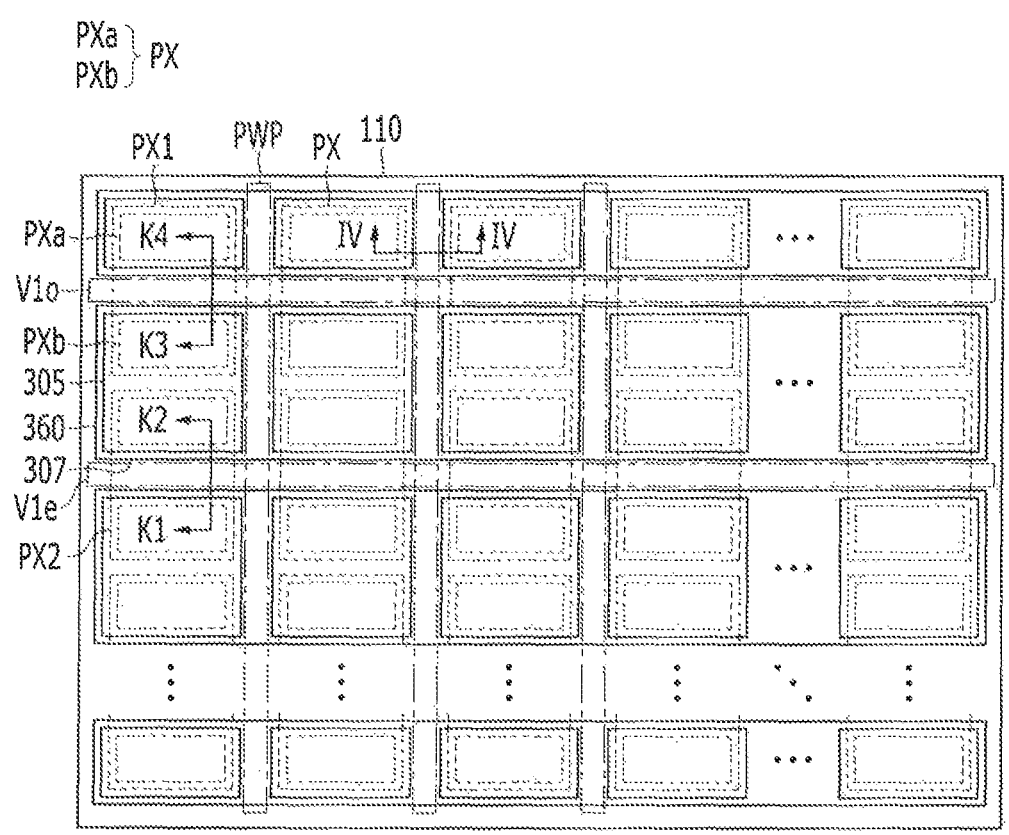
FIG. 1 is a plan view illustrating a liquid crystal display according to an exemplary embodiment of the present invention.

Hereinafter, exemplary embodiments of the present invention will be described in more detail with reference to the accompanying drawings. The present invention may be embodied in various different forms, and should not be construed as limited to the embodiments set forth herein.

In the drawings, the thickness of layers, films, panels, regions, etc., may be exaggerated for clarity. It will be understood that when a layer is referred to as being "on" another layer or substrate, it can be directly on the other layer or substrate, or intervening elements may also be present. Like reference numerals may refer to like elements throughout the specification and drawings.

Figure 2:
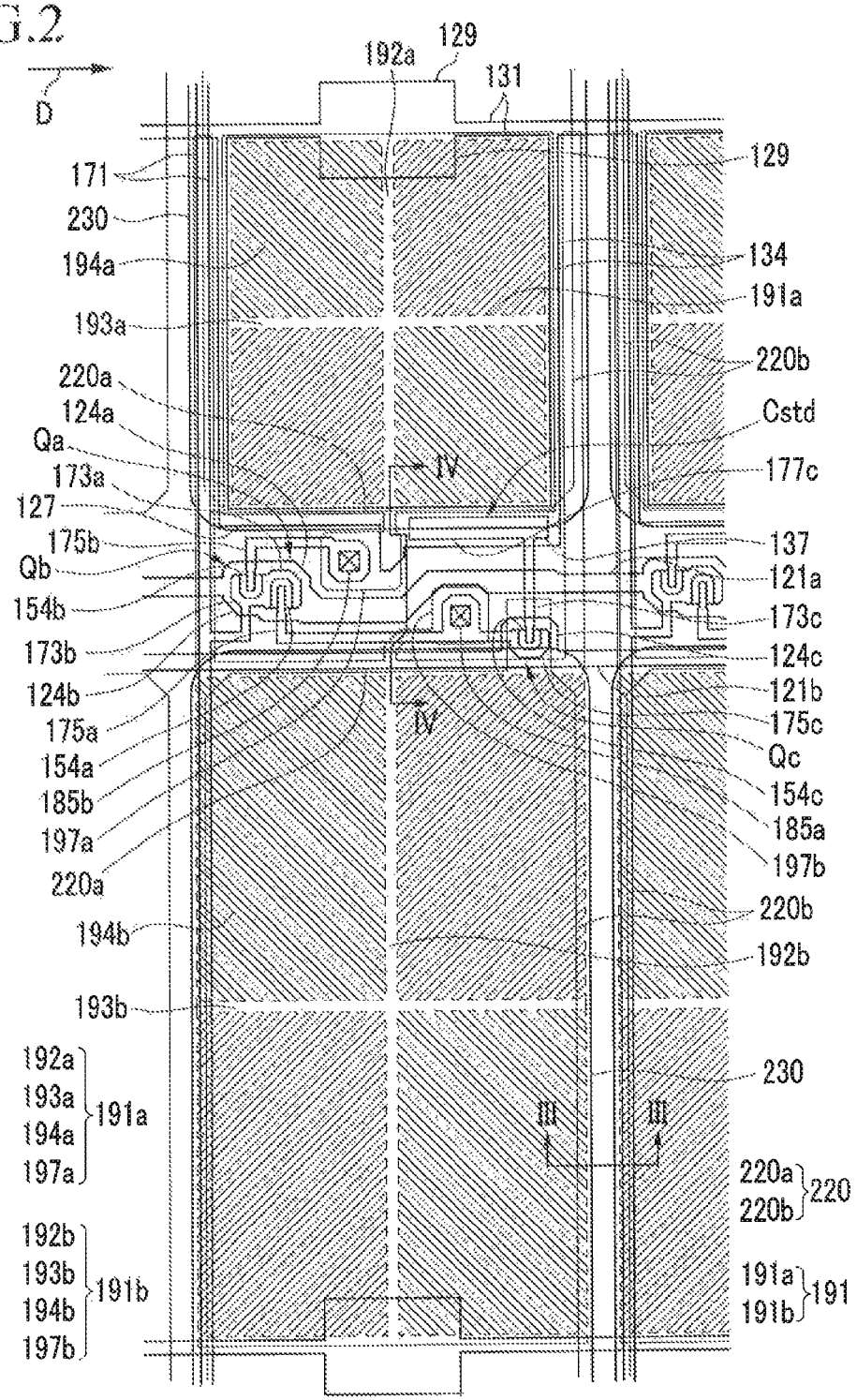
FIG. 2 is a layout view illustrating a pixel of the liquid crystal display according to an exemplary embodiment of the present invention.
Figure 3:
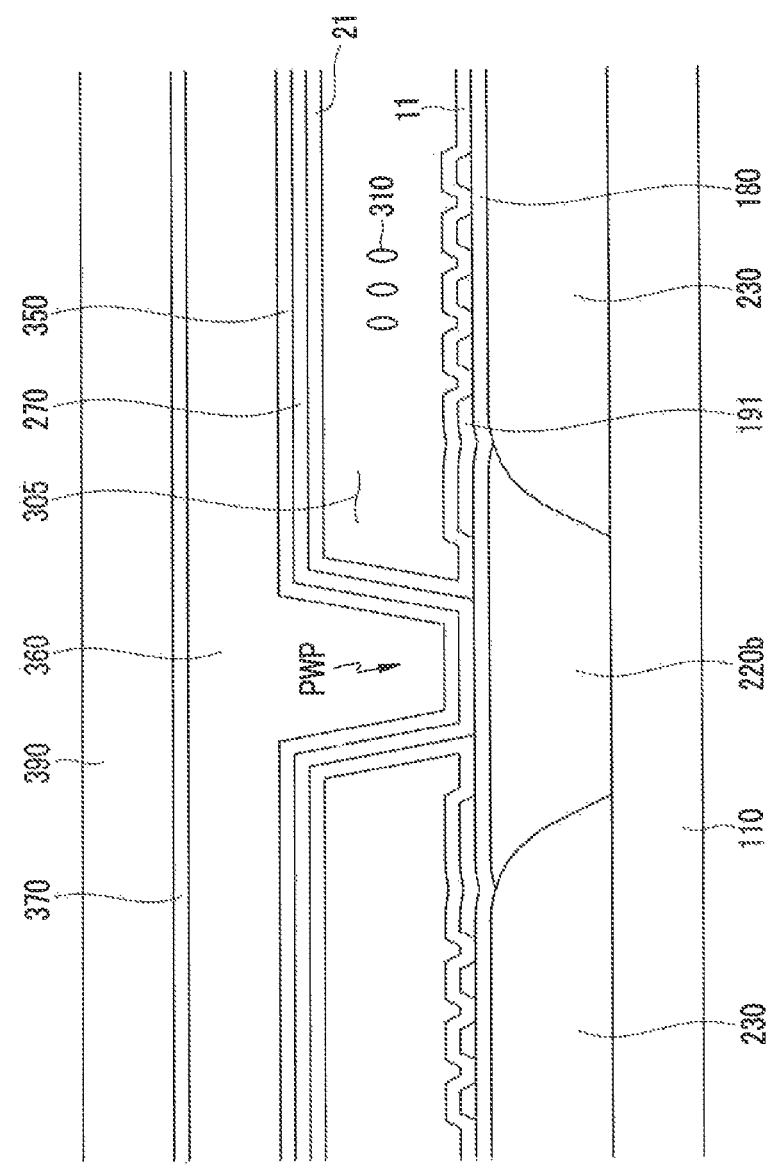
FIG. 3 is a cross-sectional view of FIG. 2 taken along line III-III.
Figure 4:
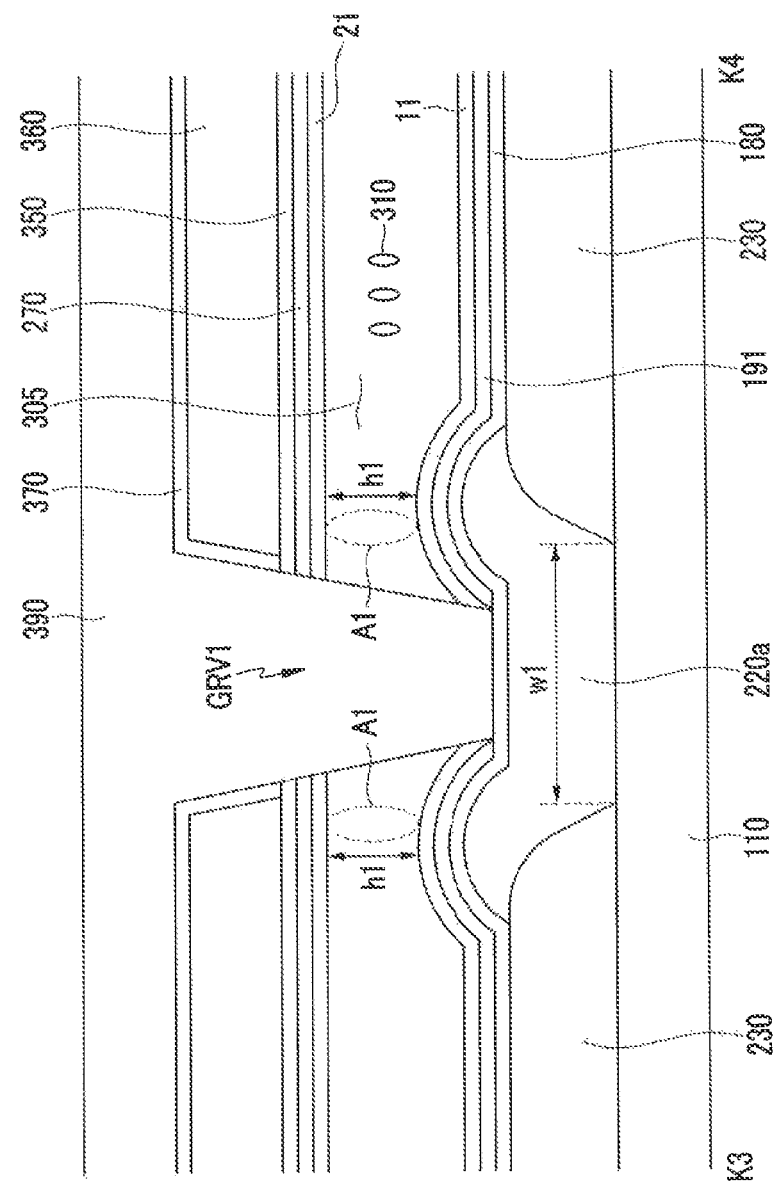
FIG. 4 is a cross-sectional view of FIG. 2 taken along line IV-IV.
Figure 5:
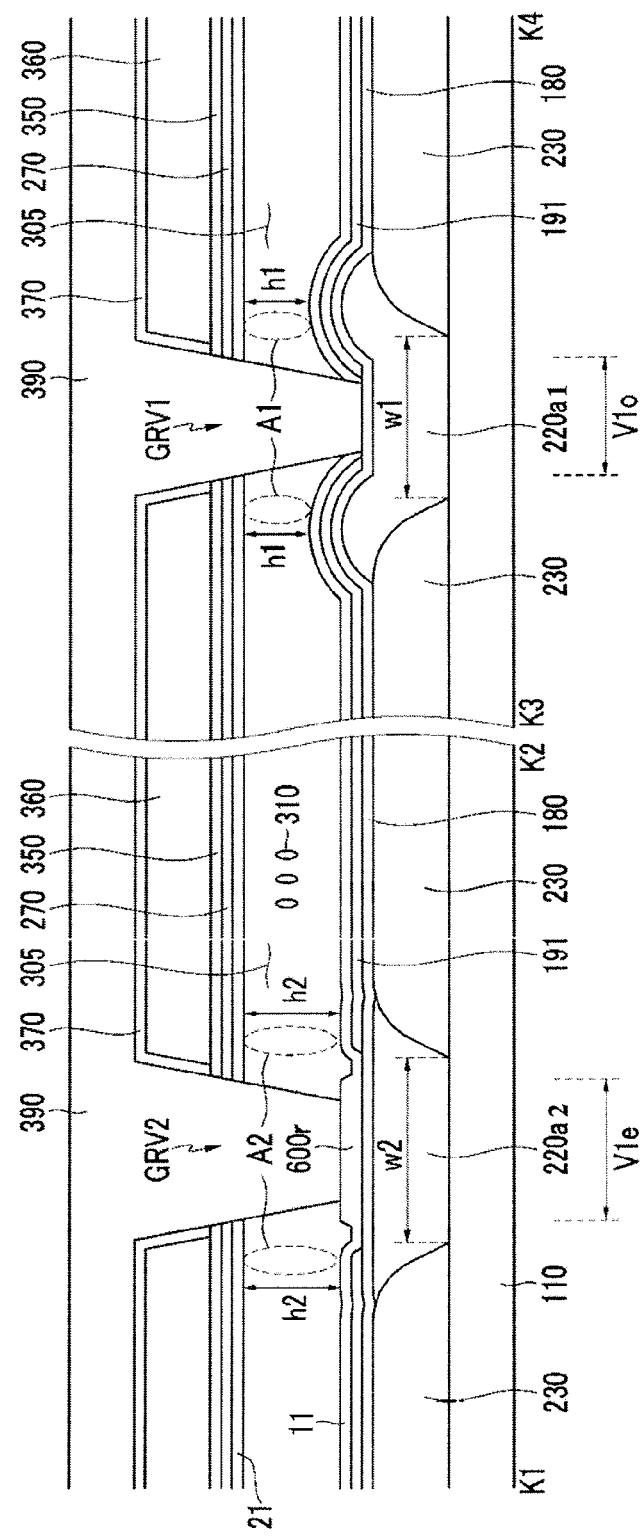
FIG. 5 is a cross-sectional view of FIG. 1 taken along lines K1-K2 and K3-K4.

FIG. 1 is a plan view illustrating a liquid crystal display according to an exemplary embodiment of the present invention. FIG. 2 is a layout view illustrating a pixel of the liquid crystal display according to an exemplary embodiment of the present invention. FIG. 3 is a cross-sectional view of FIG. 2 taken along line III-III. FIG. 4 is a cross-sectional view of FIG. 2 taken along line IV-IV. FIG. 5 is a cross-sectional view of FIG. 1 taken along lines K1-K2 and K3-K4.

More particularly, FIG. 2 illustrates a pixel among a plurality of pixels PX illustrated in FIG. 1 and FIG. 5 illustrates a partial cross-section of two pixels PX1 and PX2 which are vertically adjacent to each other in FIG. 1.

Referring to FIGS. 1 and 5, a substrate 110 may include a plurality of pixel areas PX. The plurality of pixel areas PX may be disposed in a matrix form which may include a plurality of pixel rows and a plurality of pixel columns. Each pixel area PX may include a first subpixel area PXa and a second subpixel area PXb. The first subpixel area PXa and the second subpixel area PXb may be disposed vertically.

Grooves including a first groove GRV1 and a second groove GRV2 may be disposed between the first subpixel area PXa and the second subpixel area PXb in a pixel row direction. Partition wall formation portions PWP may be disposed between a plurality of pixel columns. The first groove GRV1 may correspond to a groove V1*o* in an odd numbered row, and the second groove GRV2 may correspond to a groove V1*e* in an even numbered row. In exemplary embodiments of the present invention the first groove GRV1 may correspond to the groove V1*e* in an even numbered row, and the second groove GRV2 may correspond to the groove V1*o* in an odd numbered row. The first groove GRV1 and the second groove GRV2 may be alternately repeated.

A roof layer 360 may be formed in a pixel row direction between the groove V1*o* in the odd numbered row and the groove V1*e* in the even numbered row which may be adjacent to each other. A plurality of microcavities 305 may be formed between the roof layer 360 and the substrate 110. The microcavities 305 may be disposed in a matrix form. The roof layer 360 may be attached to the substrate 110 or separated from the substrate 110 in the partition wall formation portion PWP to form a side wall for partitioning the microcavities 305.

A pixel of the liquid crystal display according to an exemplary embodiment of the present invention will be described in more detail with reference to FIGS. 2 to 4.

Referring to FIGS. 2 to 4, thin film transistors Qa, Qb, and Qc may be disposed on the substrate 110. The substrate 110 may include transparent glass, plastic, or the like. Organic layers 230 may be disposed on the thin film transistors Qa, Qb, and Qc, and a light blocking member 220 may be formed between the adjacent organic layers 230. the organic layers 230 may include color filters.

A pixel electrode 191 may be disposed on the organic layer 230. The pixel electrode 191 may be electrically connected with a terminal of the thin film transistors Qa and Qb through contact holes 185a and 185b.

FIGS. 3 and 4 are cross-sectional views taken along lines III-III and IV-IV, but a constituent element between the substrate 110 and the organic layer 230 illustrated in FIG. 2 may be omitted in FIGS. 3 and 4. In FIGS. 3 and 4, a partial configuration of the thin film transistors Qa, Qb, and Qc may be included between the substrate 110 and the organic layer 230. The configuration of the thin film transistors Qa, Qb, and Qc and the pixel electrode 191 will be described below in more detail.

A plurality of gate conductors including a plurality of gate lines 121a, a plurality of step-down gate lines 121b, and a plurality of storage electrode lines 131 may be formed on the substrate 110.

The gate lines 121a and the step-down gate lines 121b may extend in a horizontal direction and may transfer gate signals. The gate lines 121a may include a first gate electrode 124a and a second gate electrode 124b protruding upward and downward, and the step-down gate line 121b may include a third gate electrode 124c protruding upward. The first gate electrode 124a and the second gate electrode 124b may be connected with each other to form a protrusion.

The storage electrode lines 131 may extend in a horizontal direction and may transfer a predetermined voltage such as a common voltage Vcom. The storage electrode lines 131 may include a storage electrode 129 protruding upward and downward, vertical portions 134 extending downward and substantially vertical to the gate line 121a, and a horizontal portion 127 connecting ends of the pair of vertical portions 134. The horizontal portion 127 may include a capacitor electrode 137 expanded downward.

A gate insulating layer (not illustrated) may be disposed on the gate lines 121a, step-down gate lines 121b, and storage electrode lines 131.

A plurality of semiconductor stripes (not illustrated) including amorphous or crystalline silicon or the like may be formed on the gate insulating layer. The semiconductor stripes may extend in a vertical direction, and may include first and second semiconductors 154a and 154b extending toward the first and second gate electrodes 124a and 124b. The first and second semiconductors 154a and 154b may be connected with each other. A third semiconductor 154c may be disposed on the gate electrode 124c.

A plurality of pairs of ohmic contacts (not illustrated) may be formed on the semiconductors 154a, 154b, and 154c. The ohmic contacts may include silicide or a material such as n+ hydrogenated amorphous silicon in which an n-type impurity is doped at high concentration.

Data conductors including a plurality of data lines 171, a plurality of first drain electrodes 175a, a plurality of second drain electrodes 175b, and a plurality of third drain electrodes 175c may be formed on the ohmic contacts.

The data lines 171 may transfer data signals and may extend in a vertical direction to cross the gate lines 121a and the step-down gate lines 121b. Each data line 171 may include a first source electrode 173a and a second source electrode 173b which extend toward the first gate electrode 124a and the second gate electrode 124b and may be connected to each other.

Each of the first drain electrode 175a, the second drain electrode 175b, and the third drain electrode 175c may include a wide end portion and a rod-shaped end portion. The rod-shaped end portions of the first drain electrode 175a and the second drain electrode 175b may be partially surrounded by the first source electrode 173a and the second source electrode 173b. The wide end portion of the first drain electrode 175a may be extended to form a third drain electrode 175c which may be curved in a U-lettered shape. A wide end portion 177c of a third source electrode 173c may overlap the capacitor electrode 137 to form a step-down capacitor Cstd. A rod-shaped end portion of the third source electrode 173c may be partially surrounded by the third drain electrode 175c.

The first gate electrode 124a, the first source electrode 173a, and the first drain electrode 175a may form a first thin film transistor Qa together with the first semiconductor 154a. The second gate electrode 124b, the second source electrode 173b, and the second drain electrode 175b may form a second thin film transistor Qb together with the second semiconductor 154b. The third gate electrode 124c, the third source electrode 173c, and the third drain electrode 175c may form a third thin film transistor Qc together with the third semiconductor 154c.

The semiconductor stripes including the first semiconductor 154a, the second semiconductor 154b, and the third semiconductor 154c may have substantially the same plane shape as the data conductors 171, 173a, 173b, 173c, 175a, 175b, and 175c and the ohmic contacts therebelow, except for channel regions between the source electrodes 173a, 173b, and 173c and the drain electrodes 175a, 175b, and 175c.

In the first semiconductor 154a, an exposed portion which is not covered by the first source electrode 173a and the first drain electrode 175a may be disposed between the first source electrode 173a and the first drain electrode 175a. In the second semiconductor 154b, an exposed portion which is not covered by the second source electrode 173b and the second drain electrode 175b may be disposed between the second source electrode 173b and the second drain electrode 175b. In the third semiconductor 154c, an exposed portion which is not covered by the third source electrode 173c and the third drain electrode 175c may be disposed between the third source electrode 173c and the third drain electrode 175c.

A lower passivation layer (not illustrated) including an inorganic insulator such as silicon nitride or silicon oxide may be formed on one or more of the data conductors 171, 173a, 173b, 173c, 175a, 175b, and 175c and the exposed portion of the semiconductors 154a, 154b, and 154c.

The organic layer 230 may be disposed on the lower passivation layer. The organic layers 230 may be disposed in most of regions, but might not be disposed in regions where the first thin film transistor Qa, the second thin film transistor Qb, and the third thin film transistor Qc are disposed. The organic layers 230 may be elongated in a vertical direction along a space between the data lines 171. In exemplary embodiments of the present invention, the organic layers 230 may be a color filter, and the color filter may be formed at the lower end of the pixel electrode 191 on a common electrode 270.

The light blocking member 220 may be disposed on a region where the organic layer 230 is not disposed and on a part of the organic layer 230. The light blocking member 220 may include a horizontal light blocking member 220a which may extend along the gate line 121a and the step-down gate line 121b. The horizontal light blocking member 220a may be expanded upward and downward and cover the regions in which the first thin film transistor Qa, the second thin film transistor Qb, and the third thin film transistor Qc are disposed. The horizontal light blocking member 220a may cover a vertical light blocking member 220b which extends along the data line 171.

The light blocking member 220 may be referred to as a black matrix and may block light leakage.

The organic layers 230 may be adjacent and may be spaced apart from each other in a horizontal direction D illustrated in FIG. 2 and a vertical direction crossing the horizontal direction. FIG. 3 illustrates the organic layers 230 spaced apart from each other in the horizontal direction D, and FIG. 4 illustrates the organic layers 230 spaced apart from each other in the vertical direction.

Referring to FIG. 3, the vertical light blocking member 220b may be disposed between the organic layers 230 and may be spaced apart from each other in the horizontal direction D. The vertical light blocking member 220b may overlap respective edges of the adjacent organic layers 230. Widths at which the vertical light blocking member 220b overlaps with edges of the organic layers 230 may be substantially the same as each other.

Referring to FIG. 4, the horizontal light blocking member 220a may be disposed between the organic layers 230 spaced apart from each other in the vertical direction. The horizontal light blocking member 220a may overlap respective edges of the adjacent organic layers 230. Widths at which the horizontal light blocking member 220a overlaps with edges of the organic layer 230 and a height at which the horizontal light blocking member 220a protrudes upward from the overlapping portion are symmetrical to each other. For example, as illustrated in FIG. 4, when a first portion of the horizontal light blocking member 220a overlaps with the edge of the right organic layer 230, and a second portion of the horizontal light blocking member 220a overlaps with the edge of the left organic layer 230, a height of the first portion and a height of the second portion are the same as each other.

Referring to FIGS. 1 and 5, the horizontal light blocking member 220a may include a first light blocking member 220a1 disposed to correspond to a first groove GRV1, and a second light blocking member 220a2 disposed to correspond to a second groove GRV2. A first distance w1 between the organic layers 230 which may be adjacent to each other with respect to the first light blocking member 220a1 may be smaller than a second distance w2 between the organic layers 230 which may be adjacent to each other with respect to the second light blocking member 220a2. The first light blocking member 220a1 may have a larger width which overlaps with the edge of the organic layer 230 than the second light blocking member 220a2, and as a result, a step may be generated. A volume of the first light blocking member 220a1 and a volume of the second light blocking member 220a2 may be substantially the same as each other.

An insulating layer 180 may be disposed on the organic layer 230 and the light blocking member 220. The insulating layer 180 may include an inorganic material or an organic material. When the insulating layer 180 includes the organic material, the insulating layer 180 may be formed by controlling a thickness of the insulating layer 180 so that the step formed when the organic layer 230 and the light blocking member 220 overlap with each other is not removed.

A plurality of contact holes 185a and 185b may be formed in the lower passivation layer, the light blocking member 220, and the insulating layer 180. The contact holes 185a and 185b may expose the first drain electrode 175a and the second drain electrode 175b.

The pixel electrode 191 may include the first subpixel electrode 191a and the second subpixel electrode 191b and may be formed on the insulating layer 180. The pixel electrode 191 may include a transparent conductive material such as ITO or IZO.

The first subpixel electrode 191a and the second subpixel electrode 191b may be separated from each other with the gate line 121a and the step-down gate line 121b therebetween and may be disposed at upper and lower sides, respectively, to be adjacent to each other in a column direction. A size of the second subpixel electrode 191b may be larger than a size of the first subpixel electrode 191a, and may be approximately one to three times larger than the size of the first subpixel electrode 191a.

An overall shape of the first subpixel electrode 191a and the second subpixel electrode 191b may be a quadrangle. The first subpixel electrode 191a and the second subpixel electrode 191b may include cross stems configured by horizontal stems 193a and 193b and vertical stems 192a and 192b crossing the horizontal stems 193a and 193b, respectively. The first subpixel electrode 191a and the second subpixel electrode 191b may include a plurality of minute branches 194a and 194b, a lower protrusion 197a, and an upper protrusion 197b, respectively. The upper protrusion 197b may be connected to the first drain electrode 175a and the third drain electrode 175c through the first contact hole 185a. The lower protrusion 197a may be connected to the second drain electrode 175b through the second contact hole 185b.

The pixel electrode 191 may be divided into four subregions by the horizontal stems 193a and 193b and the vertical stems 192a and 192b. The minute branches 194a and 194b may obliquely extend from the horizontal stems 193a and 193b and the vertical stems 192a and 192b, and the extending direction may form an angle of approximately 45° or approximately 135° with the gate lines 121a and 121b or the horizontal stems 193a and 193b. Extending directions of the minute branches 194a and 194b of the two adjacent subregions may be perpendicular to each other.

In exemplary embodiments of the present invention, the first subpixel electrode 191a may include an outer stem surrounding the outside of the first subpixel 191a. The second subpixel electrode 191b may include horizontal portions disposed at an upper end and a lower end, and left and right vertical portions 198 disposed at the left and the right of the first subpixel electrode 191a. The left and right vertical portions 198 may prevent capacitive bonding (e.g., coupling) between the data line 171 and the first subpixel electrode 191a.

The description of the thin film transistors and the pixel electrode described above is an exemplary embodiment of a visibility structure for increasing side visibility, and the structure of the thin film transistors and the design of the pixel electrode are not limited to the structure described in the exemplary embodiment, but may be modified according to exemplary embodiments of the present invention.

A lower alignment layer 11 may be formed on the pixel electrode 191, and may be a vertical alignment layer. The lower alignment layer 11, may be a liquid crystal alignment layer such as polyamic acid, polysiloxane, polyimide, or the like, and may include at least one of a variety of generally used materials.

An upper alignment layer 21 may be disposed facing the lower alignment layer 11, and a microcavity 305 may be formed between the lower alignment layer 11 and the upper alignment layer 21. A liquid crystal material including liquid crystal molecules 310 may be injected into the microcavity 305. The microcavity 305 may have liquid crystal injection holes A1 and A2. The microcavity 305 may be formed in a column direction, in other words, a vertical direction of the pixel electrode 191. In exemplary embodiments of the present invention, an alignment material forming the alignment layers 11 and 21 and a liquid crystal material including the liquid crystal molecules 310 may be injected into the microcavity 305 by using capillary force.

The injection holes A1 and A2 may be formed at opposite edges of the microcavities 305. A height h1 of the first injection hole A1 may be smaller than a height h2 of the second injection hole A2. An alignment material layer 600r may be formed on the second groove GRV2. The alignment material layer 600r may be formed when a remaining solid content is agglomerated after the lower alignment layer 11 and the upper alignment layer 21 are formed. In exemplary embodiments of the present invention, the alignment material layer 600r might not be formed in the first groove GRV1, but may be formed in the second groove GRV2. The alignment material layer 600r may be formed in the groove V1o in the odd numbered row illustrated in FIG. 1, but might not be formed at the groove V1e in the even numbered row.

A common electrode 270 and a lower insulating layer 350 may be disposed on the upper alignment layer 21. The common electrode 270 may receive a common voltage and generate an electric field together with the pixel electrode 191 to which the data voltage is applied to determine tilt directions of the liquid crystal molecules 310 disposed in the microcavity 305 between the common electrode 270 and the pixel electrode 191. The common electrode 270 may form a capacitor together with the pixel electrode 191 to maintain the applied voltage even after a thin film transistor is turned off. The lower insulating layer 350 may include silicon nitride (SiNx) or silicon oxide (SiO2).

In exemplary embodiments of the present invention, the common electrode 270 may be formed on the microcavity 305, but in other exemplary embodiments of the present invention, the common electrode 270 may be formed below the microcavity 305 and thus the liquid crystal may be driven according to an in-plane switching mode.

A roof layer 360 may be disposed on the lower insulating layer 350. The roof layer 360 may support the microcavity 305 which is a space between the pixel electrode 191 and the common electrode 270. The roof layer 360 may include a photoresist, or other organic materials.

An upper insulating layer 370 may be disposed on the roof layer 360. The upper insulating layer 370 may contact an upper surface of the roof layer 360. The upper insulating layer 370 may include SiNx or SiO2.

In exemplary embodiments of the present invention, the capping layer 390 may cover the liquid crystal injection holes A1 and A2 of the microcavity 305 which are exposed by the first groove GRV1 and the second groove GRV2 while filling the first groove GRV1 and the second groove GRV2. The capping layer 390 may include an organic material or an inorganic material.

In exemplary embodiments of the present invention, as illustrated in FIG. 3, a partition wall formation portion PWP may be disposed between the microcavities 305 adjacent to each other in a horizontal direction. The partition wall formation portion PWP may be formed in an extending direction of the data line 171 and may be covered by the roof layer 360. The lower insulating layer 350, the common electrode 270, the upper insulating layer 370, and the roof layer 360 may be formed on the partition wall formation portion PWP, and may form a partition wall to partition or define the microcavity 305. In exemplary embodiments of the present invention, when a partition wall structure such as the partition wall formation portion PWP exists between the microcavities 305, even though the insulation substrate 110 may be bent, a stress generated may be small and a changed degree of a cell gap may be reduced.

Figure 6:
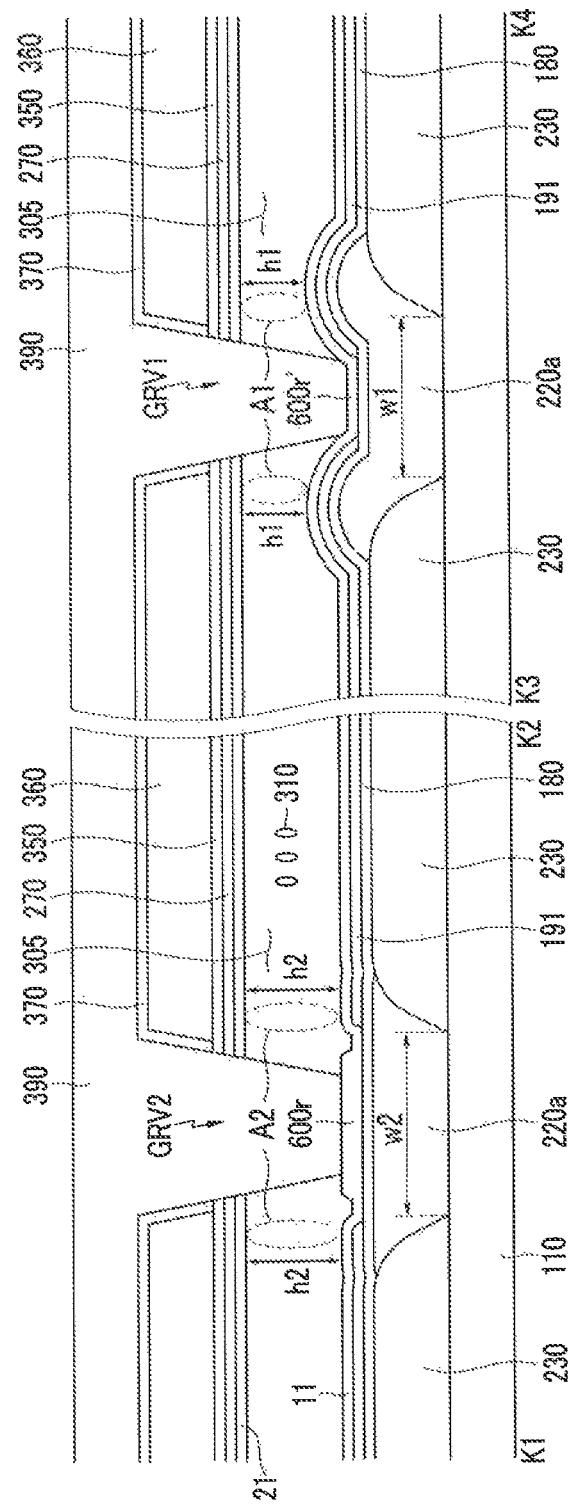
FIG. 6 is a cross-sectional view illustrating a liquid crystal display according to an exemplary embodiment of the present invention.

FIG. 6 is a cross-sectional view illustrating a liquid crystal display according to an exemplary embodiment of the present invention.

The exemplary embodiment described with reference to FIG. 6 is almost the same as the exemplary embodiments described with reference to FIGS. 1 to 5. However, an alignment material layer 600r' is formed in the first groove GRV1 in addition to the alignment material layer 600r formed in the second groove GRV2. For example, a thickness of the alignment material layer 600r' formed in the first groove GRV1 may be smaller than a thickness of the alignment material layer 600r formed in the second groove GRV2. The alignment material layer 600r' formed in the first groove GRV1 may be formed when an aligning agent injected into the microcavity 305 is dried after a small amount of aligning agent flows into the first groove GRV1 above an edge of the step formed at the horizontal light blocking member 220a, or a small amount of aligning agent is injected into the first groove GRV1 during an aligning agent injecting process.

The elements of the embodiments described with reference to FIGS. 1 to 5 except for the difference described above may be applied to the exemplary embodiment of the present invention described with reference to FIG. 6.

Figure 7:
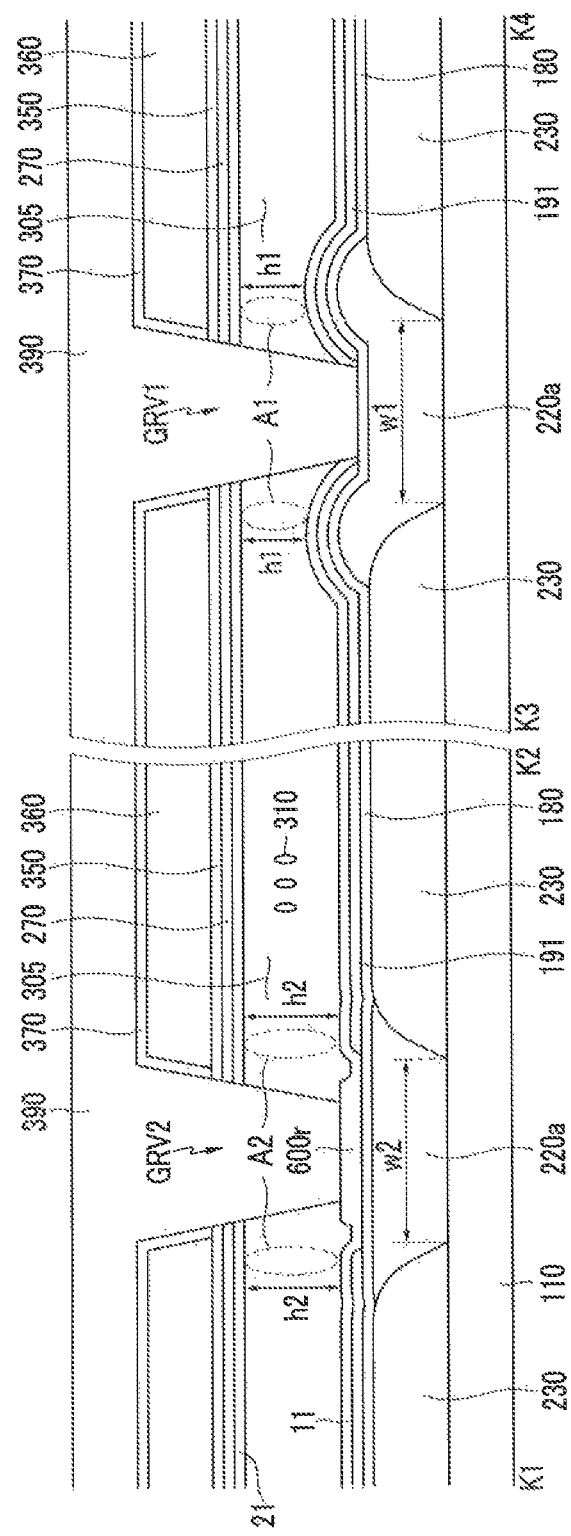
FIG. 7 is a cross-sectional view illustrating a liquid crystal display according to an exemplary embodiment of the present invention.

FIG. 7 is a cross-sectional view illustrating a liquid crystal display according to an exemplary embodiment of the present invention.

The exemplary embodiment be described with reference to FIG. 7 is almost the same as the exemplary embodiments described with reference to FIGS. 1 to 5. However, the horizontal light blocking member 220a may be divided into the first light blocking member disposed to correspond to the first groove GRV1 and the second light blocking member disposed to correspond to the second groove GRV2. The first distance w1 between the organic layers 230 which may be adjacent to each other with respect to the first light blocking member may be the same as the second distance w2 between the organic layers 230 which may be adjacent to each other with respect to the second light blocking member. For example, the volume of the first light blocking member may be larger than the volume of the second light blocking member.

The elements of the embodiments described with reference to FIGS. 1 to 5 except for the difference described above may be applied to the exemplary embodiment of the present invention described with reference to FIG. 7.

Figure 8:
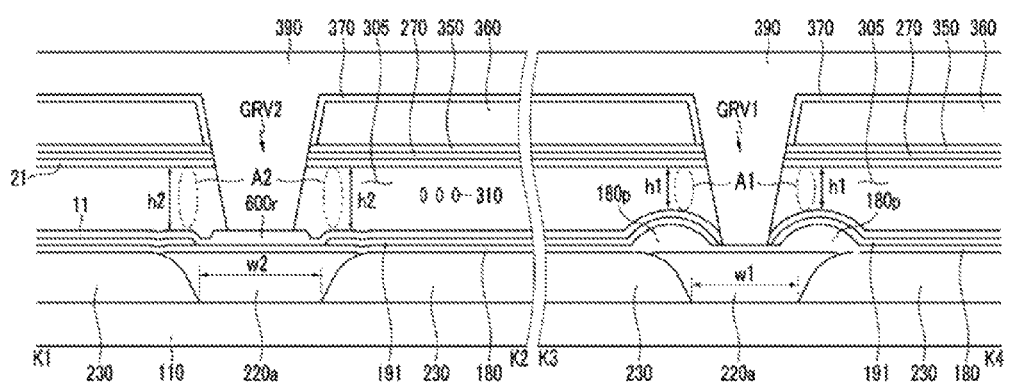
FIG. 8 is a cross-sectional view illustrating a liquid crystal display according to an exemplary embodiment of the present invention.

FIG. 8 is a cross-sectional view illustrating a liquid crystal display according to an exemplary embodiment of the present invention.

The exemplary embodiment described with reference to FIG. 8 is almost the same as the exemplary embodiments described in FIGS. 1 to 5. However, the horizontal light blocking member 220a may be divided into the first light blocking member disposed to correspond to the first groove GRV1 and the second light blocking member disposed to correspond to the second groove GRV2. Widths of the first light blocking member and the second light blocking member which may overlap with the edge of the organic layer 230 may be the same as each other, and the step might not be generated. A protrusion 180p may be formed in the insulating layer 180 formed on the organic layer 230 and the light blocking member 220. The protrusion 180p may be disposed to be adjacent to the portion where the first light blocking member overlaps with the edge of the organic layer 230. The insulating layer 180 may include an organic material, and the protrusion 180p may be formed using a slit mask, a halftone mask, or the like when the insulating layer 180 is formed.

The elements of the embodiments described with reference to FIGS. 1 to 5 except for the difference described above may be applied to the exemplary embodiment described with reference to FIG. 8.

Hereinafter, an exemplary embodiment of manufacturing the liquid crystal display described above will be described with reference to FIGS. 9 to 23. The exemplary embodiment described below is an exemplary embodiment of the manufacturing method and may be modified in a variety of ways.

FIGS. 9 to 23 are cross-sectional views illustrating a method of manufacturing a liquid crystal display according to an exemplary embodiment of the present invention. FIGS. 9, 10, 11, 12, 13, 15, 17, 19, 20, 22, and 23 illustrate cross-sectional views of FIG. 1 taken along lines K1-K2 and K3-K4. FIGS. 14, 16, 18, and 21 are cross-sectional views of FIG. 2 taken along line III-III.

Figure 9:
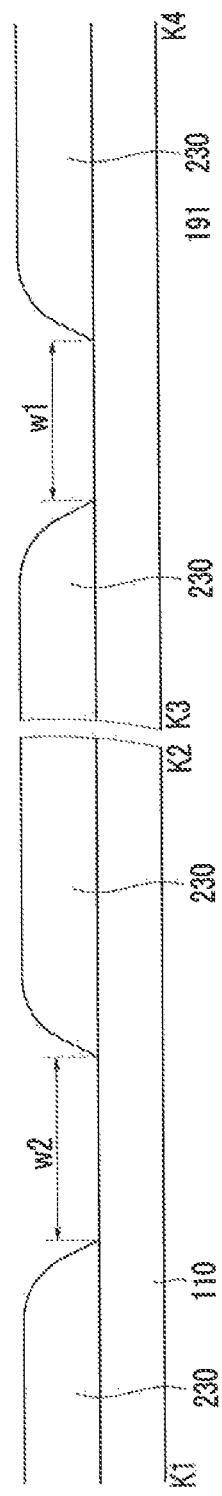

Referring to FIG. 9, the thin film transistors Qa, Qb, and Qc (illustrated in FIG. 2) may be formed on the substrate 110. The substrate 110 may include transparent glass or plastic. The organic layer 230 may be formed on the thin film transistors Qa, Qb, and Qc to correspond to a pixel area.

The organic layer 230 may be formed to have a first distance w1 and a second distance w2 separating parts thereof. The first distance w1 may be smaller than the second distance w2.

Figure 10:
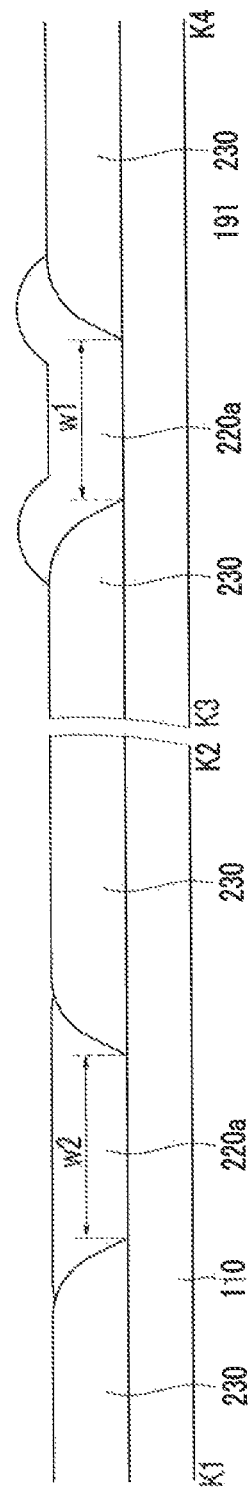

Referring to FIG. 10, the horizontal light blocking member 220a may be formed between the adjacent organic layers 230. The horizontal light blocking member 220a may overlap the edges of the adjacent organic layers 230. In the exemplary embodiment of the present invention, the horizontal light blocking member 220a may be formed between the organic layers 230 having the first distance w1. The horizontal light blocking member 220a having the first distance w1 may overlap the edge of the organic layer 230 more than the horizontal light blocking member 220a formed between the organic layers 230 having the second distance w2. As the overlapping width is increased, the step of the horizontal light blocking member 220a may be increased.

In an exemplary embodiment of the present invention, the volume of the horizontal light blocking member 220a filling the first distance w1 when the first distance w1 and the second distance w2 are equally formed may be larger than the volume of the horizontal light blocking member 220a filling the second distance w2, and as a result, an asymmetrical step may be formed. According to the exemplary embodiment of the present invention, the liquid crystal display may be formed as described in FIG. 7.

In an exemplary embodiment of the present invention, the horizontal light blocking member 220a filling the first distance w1 when the first distance w1 and the second distance w2 are equally formed and the horizontal light blocking member 220a filling the second distance w2 may have the same width overlapping with the edge of the organic layer 230, and as a result, the step might not be formed. For example, a protrusion 180p may be formed in the insulating layer 180 formed on the organic layer 230 and the light blocking member 220 to form the asymmetrical step. According to the exemplary embodiment of the present invention, the liquid crystal display may be formed as described in FIG. 8.

Figure 11:
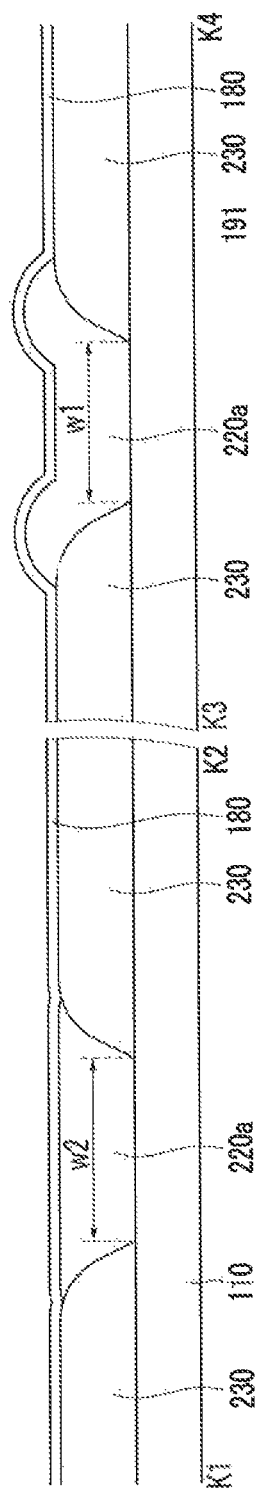

Referring to FIG. 11, the insulating layer 180 may be formed on the organic layer 230 and the horizontal light blocking member 220a. Only the horizontal light blocking member 220a is illustrated in FIG. 11, but the vertical light blocking member 220b illustrated in FIG. 2 may be formed simultaneously with the horizontal light blocking member 220a. Accordingly, the insulating layer 180 may be formed on the vertical light blocking member 220b.

The insulating layer 180 may include an inorganic material or an organic material. When the insulating layer 180 includes the organic material, the insulating layer 180 may be formed by controlling a thickness of the insulating layer 180 so that the step formed when the organic layer 230 and the horizontal light blocking member 220a overlap with each other is maintained.

Figure 12:
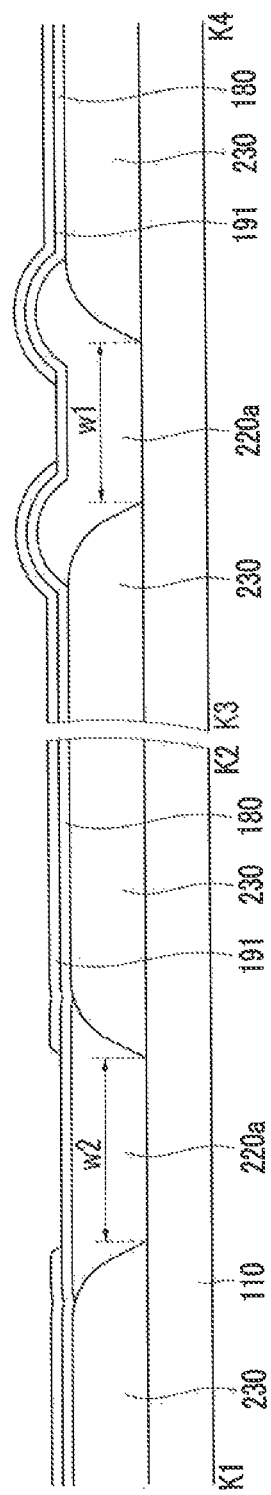

Referring to FIG. 12, after a pixel electrode material is formed, the pixel electrode material may be patterned so that the pixel electrode 191 is disposed at a portion of the liquid crystal display corresponding to the pixel area. For example, the pixel electrode 191 may be electrically connected with one terminal of the thin film transistors Qa and Qb through the contact holes 185a and 185b (illustrated in FIG. 1).

Figure 13:
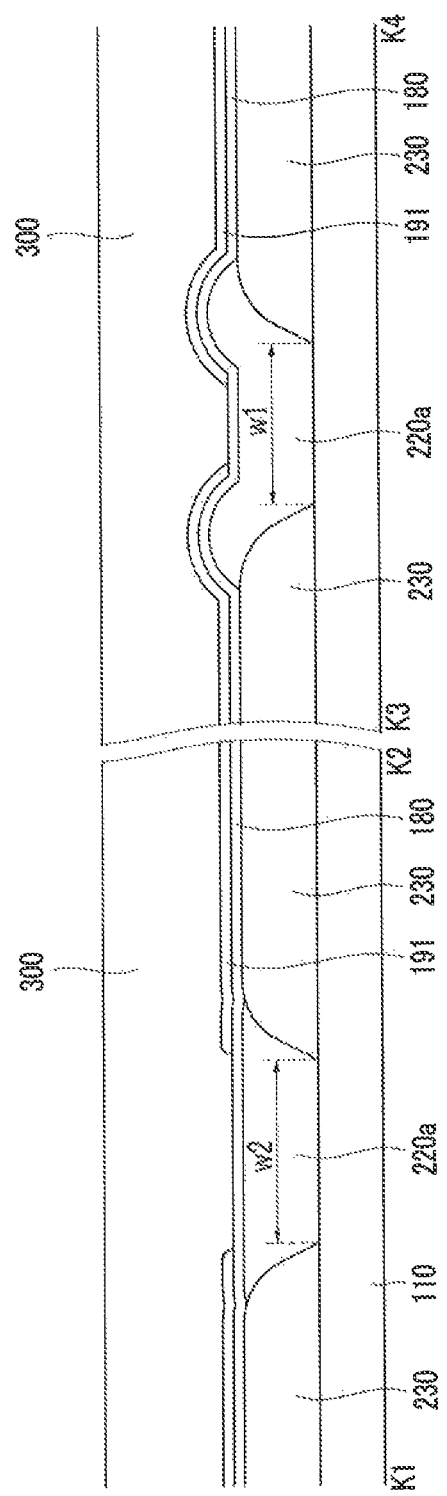
Figure 14:
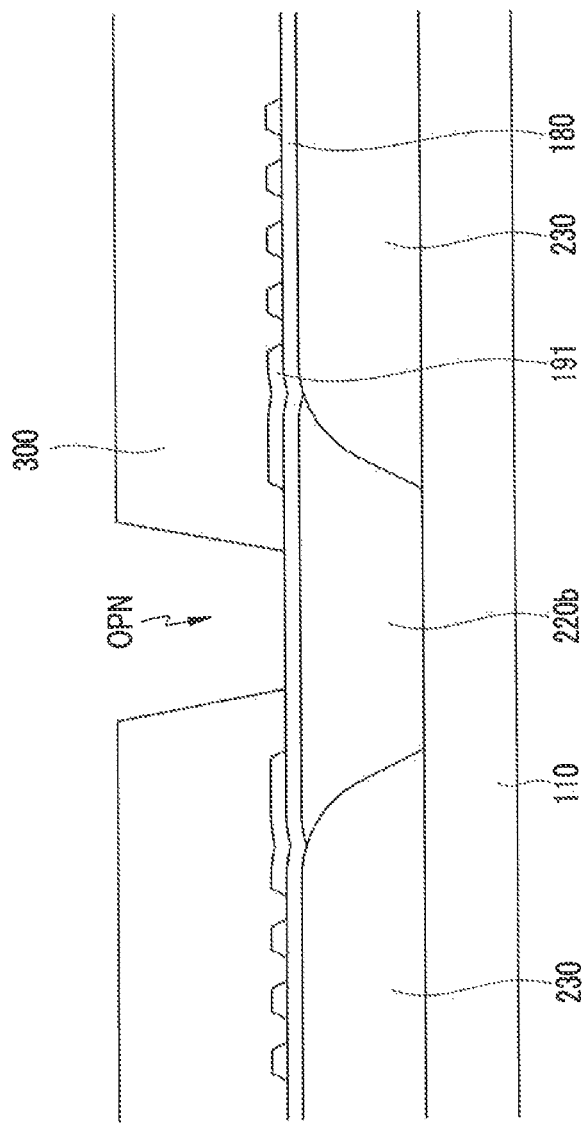

Referring to FIGS. 13 and 14, a sacrificial layer 300 may be formed on the pixel electrode 191. As illustrated in FIG. 14, an open portion OPN may be formed in a parallel direction with the data line 171 in the sacrificial layer 300. In a subsequent process, the common electrode 270, the lower insulating layer 350, the roof layer 360, and the upper insulating layer 370 may be filled in the open portion OPN to form the partition wall formation portion PWP (illustrated in FIG. 3, for example).

Figure 15:
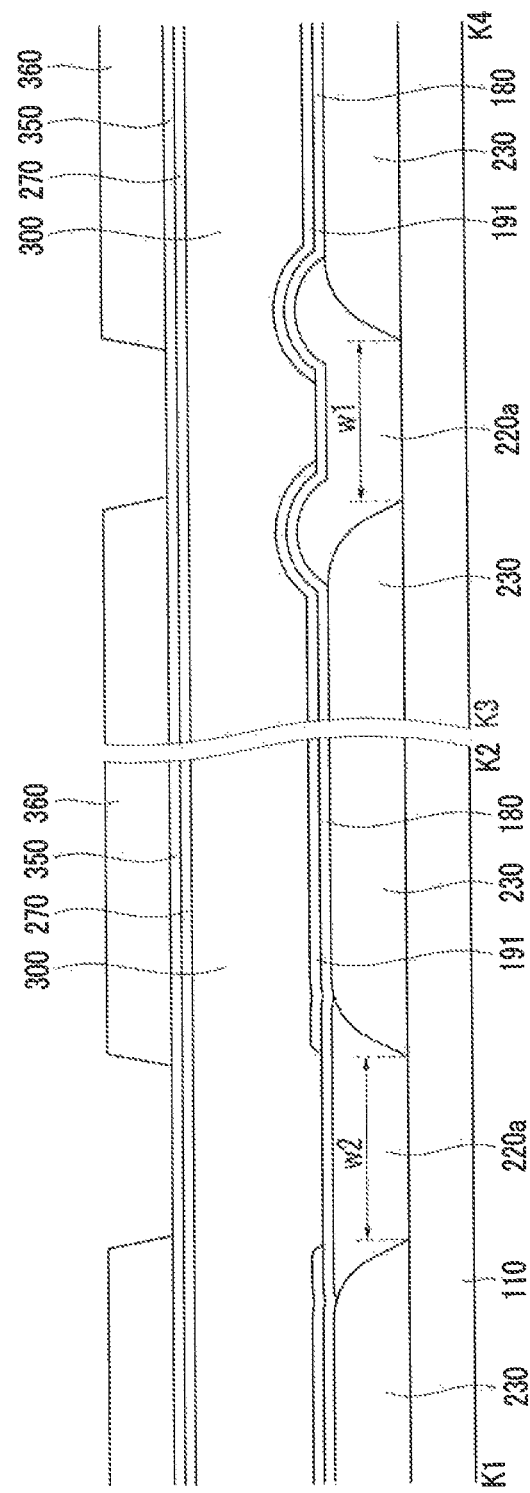
Figure 16:
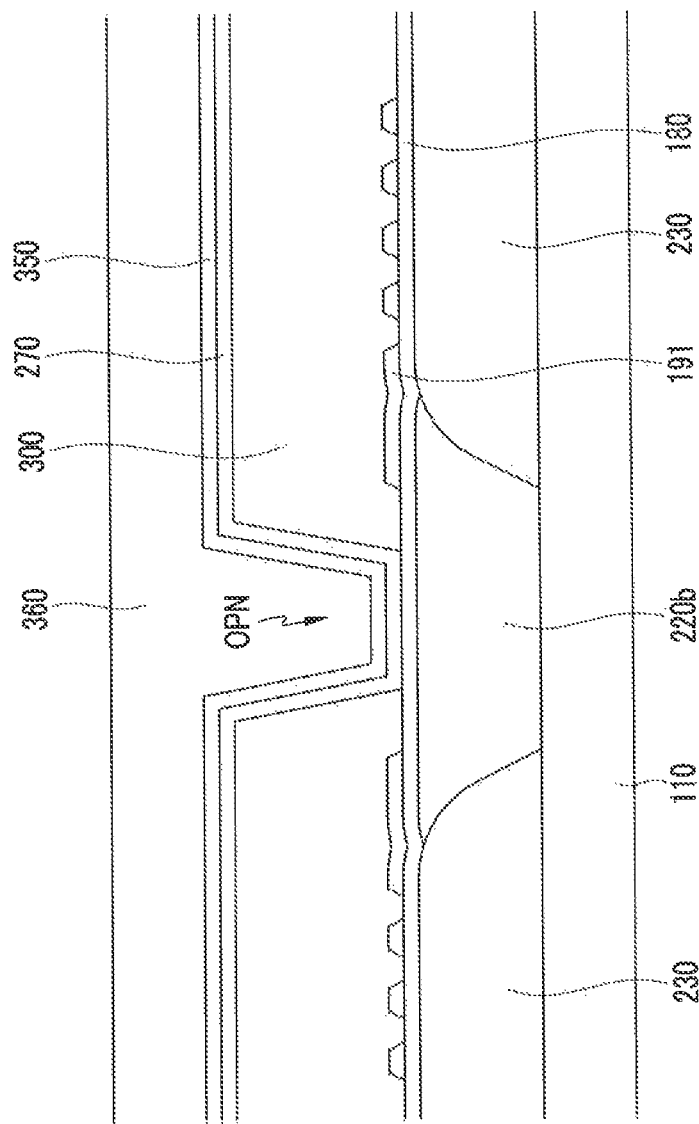

Referring to FIGS. 15 and 16, the common electrode 270, the lower insulating layer 350, and the roof layer 360 may be sequentially formed on the sacrificial layer 300. The roof layer 360 may be removed in a region corresponding to the horizontal light blocking member 220a disposed between the adjacent pixel areas in the vertical direction by exposing and developing processes. The roof layer 360 may expose the lower insulating layer 350 to an outside of the liquid crystal display in the region corresponding to the horizontal light blocking member 220a. For example, the common electrode 270, the lower insulating layer 350, and the roof layer 360 may fill the open portion OPN of the vertical light blocking member 220b to form the partition wall formation portion PWP (illustrated in FIG. 3, for example).

Figure 17:
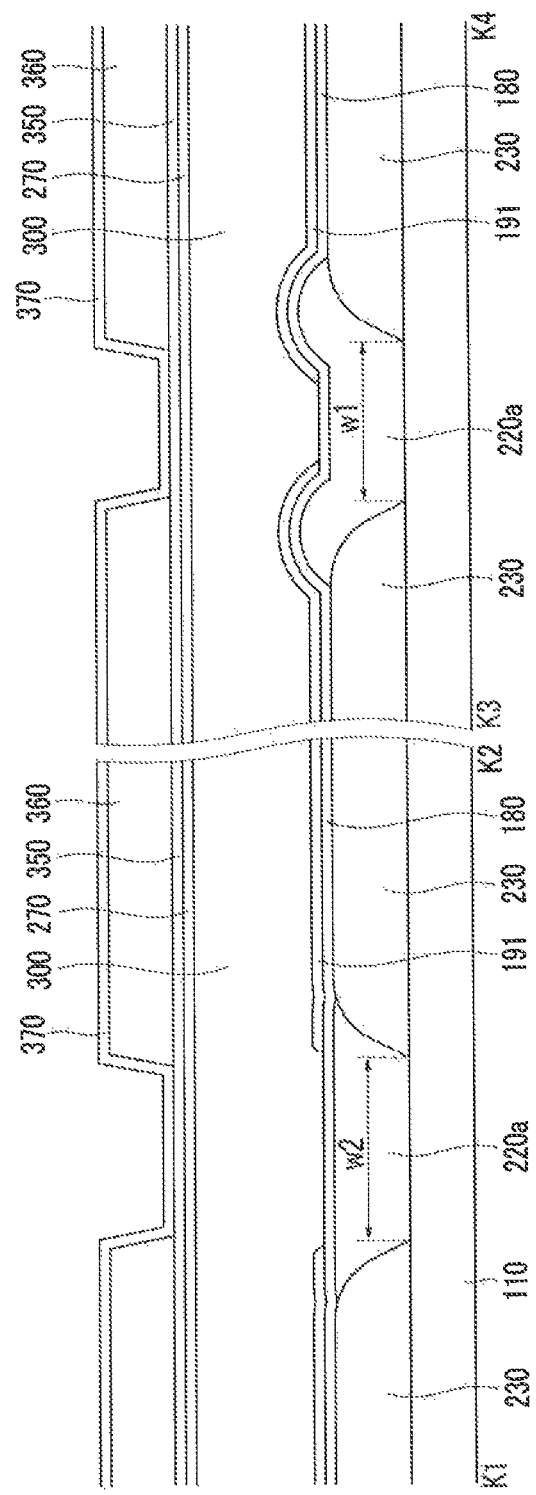
Figure 18:
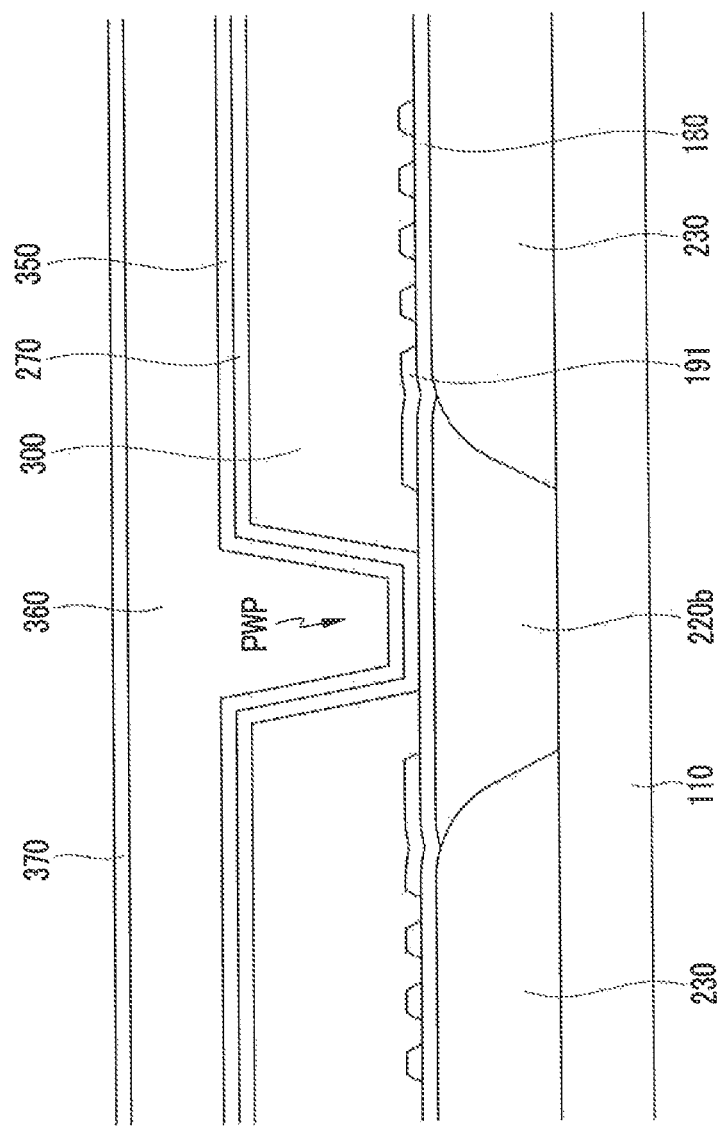

Referring to FIGS. 17 and 18, the upper insulating layer 370 may be formed to cover the roof layer 360 and the exposed lower insulating layer 350.

Figure 19:
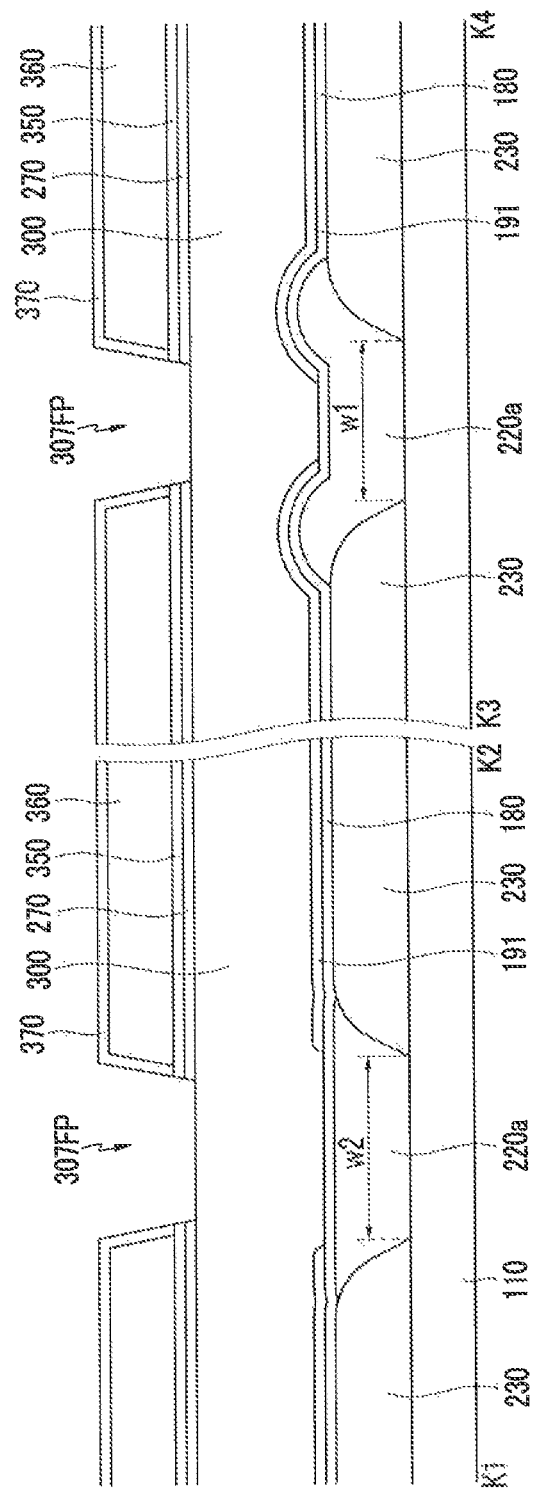

Referring to FIG. 19, the upper insulating layer 370, the lower insulating layer 350, and the common electrode 270 may be partially removed by dry-etching to form an injection hole formation region 307FP. For example, the sacrificial layer 300 may be exposed. The upper insulating layer 370 may have a structure covering the side of the roof layer 360, but is not limited thereto, and the upper insulating layer 370 covering the side of the roof layer 360 may be removed to expose the side of the roof layer 360 to the outside of the liquid crystal display.

Figure 20:
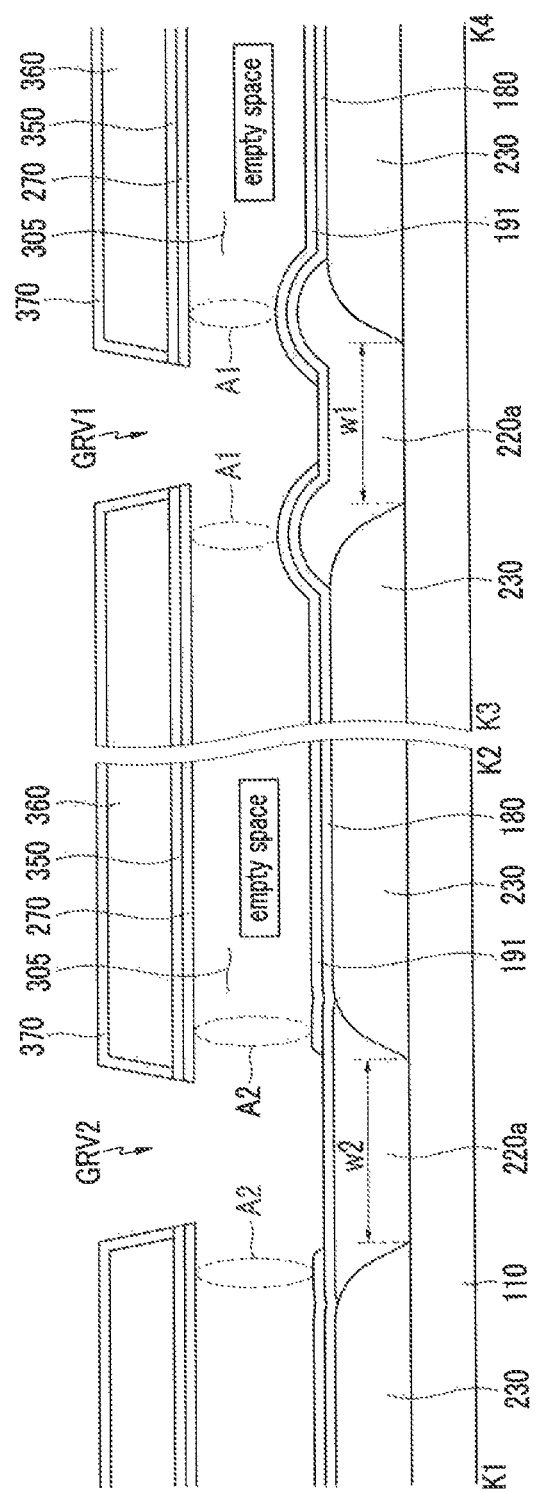
Figure 21:
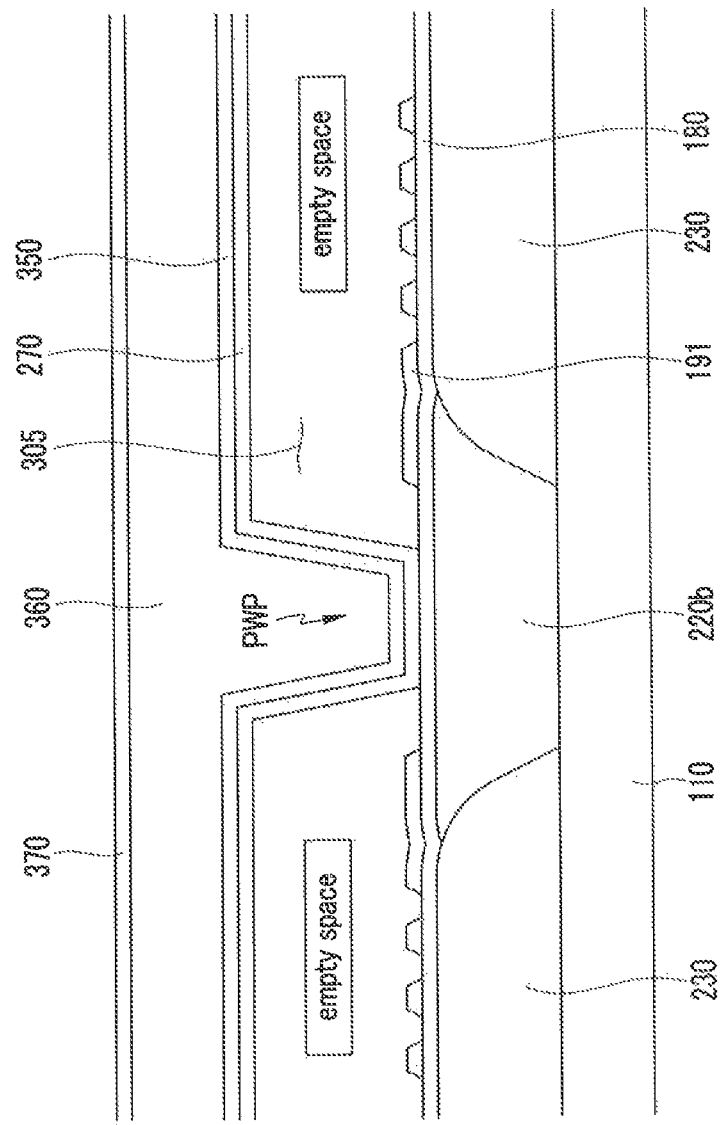

Referring to FIGS. 20 and 21, the sacrificial layer 300 may be removed by an oxygen (O2) ashing process or a wet-etching method through the injection hole formation region 307FP. For example, the microcavity 305 having the injection holes A1 and A2 may be formed. The microcavity 305 is an empty space that may be formed when the sacrificial layer 300 is removed. For example, a groove including the first groove GRV1 and the second groove GRV2 may be formed.

Figure 22:
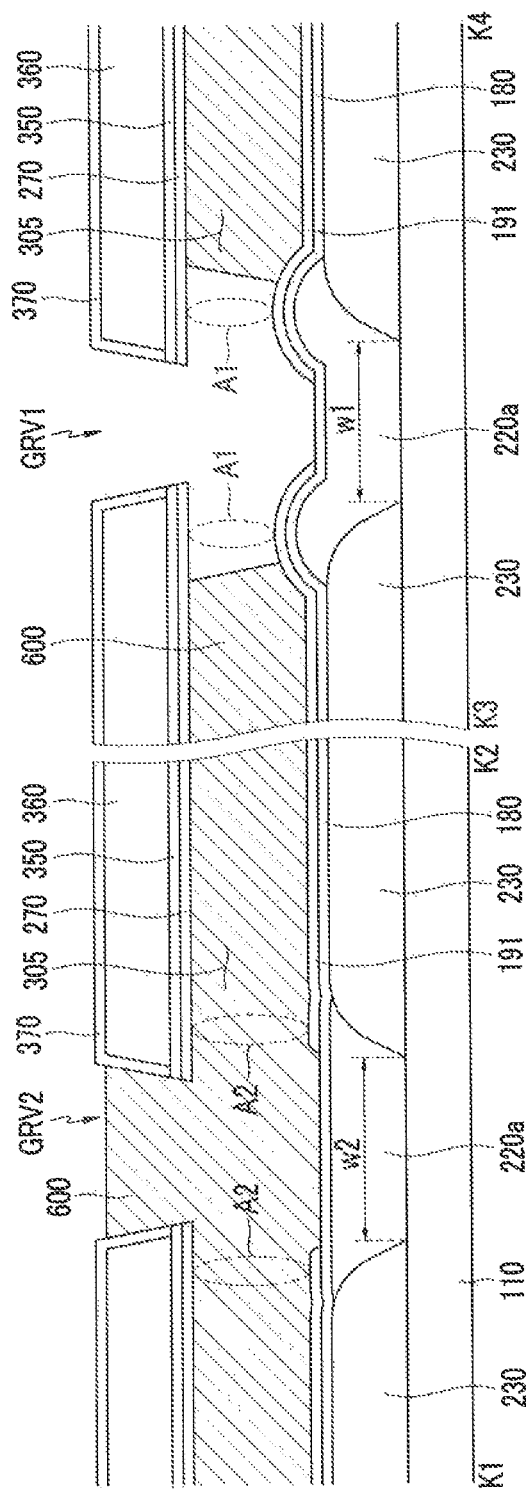

Referring to FIG. 22, the injection hole may include a first injection hole A1 formed in the first groove GRV1 and a second injection hole A2 formed in the second groove GRV2. In an exemplary embodiment of the present invention, when the aligning agent 600 is injected into the second groove GRV2, the aligning agent 600 may be injected into the microcavity 305 through the second injection hole A2.

In the exemplary embodiment, the aligning agent 600 might not be supplied to the first groove GRV1 corresponding to the groove V1o in the odd numbered row as illustrated in FIG. 1, but may be supplied to the second groove GRV2 corresponding to the groove V1e in the even numbered row. The aligning agent 600 may be formed in the pixel area PX and the second groove GRV2. For example, the aligning agent 600 may be fully filled inside the microcavity 305, and supplied to reach a height of the roof layer 360 at the second groove GRV2. The aligning agent 600 might not be dispersed due to a high step of the horizontal light blocking member 220a by overlapping of the organic layer 230 and the horizontal light blocking member 220a, and as a result, the aligning agent 600 might not be supplied to the first groove GRV1. The contents of the odd numbered row and the even numbered row may be changed.

Referring to FIG. 23, when a bake process is performed on the aligning agent 600, a solvent component may be volatilized, and the alignment material may remain on upper and lower wall surfaces of the microcavity 305 and the second groove GRV2. The alignment layers 11 and 21 may be formed on the upper and lower wall surfaces of the microcavity 305, and the alignment material layer 600r may be formed on the insulating layer 180 in the second groove GRV2.

The liquid crystal material including the liquid crystal molecules 310 may be injected into the microcavity 305 through the first injection hole A1 and the second injection hole A2 by using an inkjet method and the like.

The capping layer 390 may be formed on the upper insulating layer 370 to cover the first groove GRV1 and the second groove GRV2 to form the liquid crystal display described in FIGS. 1 to 5. The capping layer 390 may cover the injection holes A1 and A2.

According to exemplary embodiments of the present invention, heights of injection holes of the groove in the odd numbered row and the groove in the even numbered row are asymmetrically formed, and an aligning agent is injected into one of the groove in the odd numbered row and the groove in the even numbered row, and as a result, it is possible to prevent a solid content from being agglomerated inside the microcavity while injecting and drying the aligning agent in the microcavity.

While the present invention has been shown and described with reference to the exemplary embodiments thereof, it will be apparent to those of ordinary skill in the art that various changes in form and detail may be made thereto without departing from the spirit and scope of the invention as defined by the claims.

What is claimed is:

1. A liquid crystal display, comprising:
a substrate;
a thin film transistor disposed on the substrate;
a pixel electrode connected to the thin film transistor;
a roof layer facing the pixel electrode;
a plurality of microcavities disposed between the pixel electrode and the roof layer, wherein each of the microcavities comprises liquid crystal molecules;
a plurality of grooves extending in a direction substantially parallel to a top surface of the substrate and disposed between the microcavities;
a first injection hole disposed at an edge of a microcavity of the microcavities adjacent to a first groove of the grooves;
a second injection hole disposed at an edge of a microcavity of the microcavities adjacent to a first groove of the grooves, wherein a height of the first injection hole and a height of the second injection hole are different from each other; and
an alignment material layer disposed in one of the first groove and the second groove.

2. The liquid crystal display of claim 1, wherein:
the plurality of microcavities are disposed in a matrix form,
the first groove and the second groove extend in a row between the plurality of microcavities, and
one of the first groove and the second groove is disposed in an odd numbered row between the plurality of microcavities, and the other one of the first groove and the second groove is disposed in an even numbered row between the plurality of microcavities.

3. The liquid crystal display of claim 2, further comprising:
a plurality of organic layers disposed on the substrate;
a light blocking member disposed between the plurality of organic layers; and
an insulating layer disposed on the plurality of organic layers and the light blocking member,
wherein the light blocking member includes a first light blocking member corresponding to the first groove and a second light blocking member corresponding to the second groove, and
the insulating layer includes a protrusion disposed adjacent to a portion of the liquid crystal display where the first light blocking member and an edge of the organic layer overlap with each other.

4. The liquid crystal display of claim 2, wherein:
a thickness of a first alignment material layer disposed in the first groove and a thickness of a second alignment material layer disposed in the second groove are different from each other.

5. The liquid crystal display of claim 2, wherein:
the alignment material layer is disposed in the second groove, but is not disposed in the first groove.

6. The liquid crystal display of claim 2, further comprising:
a plurality of organic layers disposed on the substrate; and
a light blocking member disposed between the plurality of organic layers, wherein the light blocking member includes a first light blocking member corresponding to the first groove and a second light blocking member corresponding to the second groove, and an overlapping width of the first light blocking member and an edge of the organic layer is larger than an overlapping width of the second light blocking member and the edge of the organic layer.

7. The liquid crystal display of claim 6, wherein:

a first distance between the organic layers which are adjacent to each other with respect to the first light blocking member is smaller than a second distance between the organic layers which are adjacent to each other with respect to the second light blocking member.

8. The liquid crystal display of claim 6, wherein:

a first distance between the organic layers which are adjacent to each other with respect to the first light blocking member is substantially the same as a second distance between the organic layers which are adjacent to each other with respect to the second light blocking member.

9. The liquid crystal display of claim 1, further comprising:

a capping layer disposed on the roof layer, wherein the capping layer covers the first groove and the second groove.

10. The liquid crystal display of claim 1, further comprising:

alignment layers disposed at an upper portion and a lower portion of the first microcavity.

11. A method of manufacturing a liquid crystal display, comprising:

forming a thin film transistor on a substrate;

forming a pixel electrode to be connected with the thin film transistor;

forming a sacrificial layer on the pixel electrode;

forming a roof layer on the sacrificial layer;

patterning the roof layer so that a part of the sacrificial layer is exposed;

forming a plurality of microcavities disposed between the pixel electrode and the roof layer by removing the sacrificial layer and forming a first groove and a second groove extending in a direction substantially parallel to a top surface of the substrate and between the microcavities;

injecting an aligning agent into one of the first groove and the second groove which are adjacent to each other;

injecting a liquid crystal material into the microcavities through a first injection hole and a second injection hole, wherein the first injection hole is disposed at an edge of a microcavity of the microcavities adjacent to the first groove, wherein the second injection hole is disposed at an edge of a microcavity of the microcavities adjacent to the second groove, and wherein a height of the first injection hole and a height of the second injection hole are different from each other;

forming a capping layer on the roof layer; and forming an alignment material layer in one of the first groove and the second groove.

12. The method of manufacturing a liquid crystal display of claim 11, wherein:

the plurality of microcavities are formed in a matrix form, the first groove and the second groove are formed to extend in a row direction between the plurality of microcavities, and one of the first groove and the second groove is formed in an odd numbered row between the plurality of microcavities, and the other one of the first groove and the second groove is formed in an even numbered row between the plurality of microcavities.

13. The method of manufacturing a liquid crystal display of claim 12, further comprising:

forming a plurality of organic layers on the substrate;

forming a light blocking member between the plurality of organic layers; and forming an insulating layer on the plurality of organic layers and the light blocking member, wherein the light blocking member includes a first light blocking member disposed to correspond to the first groove and a second light blocking member disposed to correspond to the second groove, and the insulating layer includes a protrusion disposed to be adjacent to a portion of the liquid crystal display where the first light blocking member and an edge of the organic layer overlap with each other.

14. The method of manufacturing a liquid crystal display of claim 12, wherein:

the alignment agent is injected into the second groove, but is not injected into the first groove.

15. The method of manufacturing a liquid crystal display of claim 14, wherein:

the aligning agent includes an alignment material including a solid material and a solvent, and wherein a remaining solid material forms the alignment material layer after the solvent is evaporated.

16. The method of manufacturing a liquid crystal display of claim 15, wherein:

the alignment material layer is formed in the second groove, but is not formed in the first groove.

17. The method of manufacturing a liquid crystal display of claim 12, further comprising:

forming a plurality of organic layers on the substrate; and forming a light blocking member between the plurality of organic layers, wherein the light blocking member includes a first light blocking member corresponding to the first groove and a second light blocking member corresponding to the second groove, and an overlapping width of the first light blocking member and an edge of the organic layer is larger than an overlapping width of the second light blocking member and an edge of the organic layer.

18. The method of manufacturing a liquid crystal display of claim 17, wherein:

a first distance between the organic layers which are adjacent to each other with respect to the first light blocking member is smaller than a second distance between the organic layers which are adjacent to each other with respect to the second light blocking member.

19. The method of manufacturing a liquid crystal display of claim 17, wherein:

a first distance between the organic layers which are adjacent to each other with respect to the first light blocking member is substantially the same as a second distance between the organic layers which are adjacent to each other with respect to the second light blocking member.

20. The method of manufacturing a liquid crystal display of claim 19, wherein:

a size of the first light blocking member is larger than a size of the second light blocking member.

* * * * *